June 7, 1966  S. R. OVSHINSKY  3,255,324
MOISTURE RESPONSIVE RESISTANCE DEVICE
Filed May 28, 1962
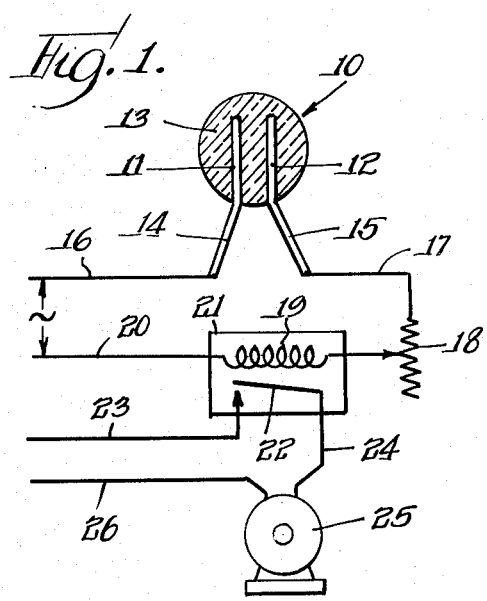
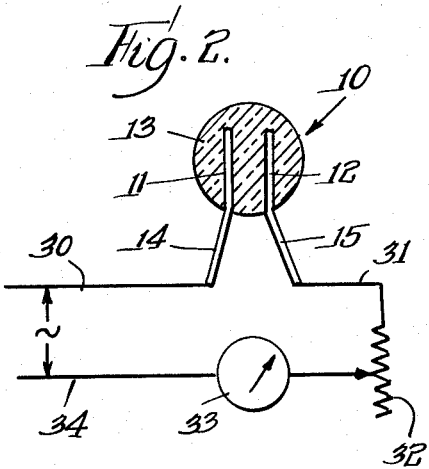
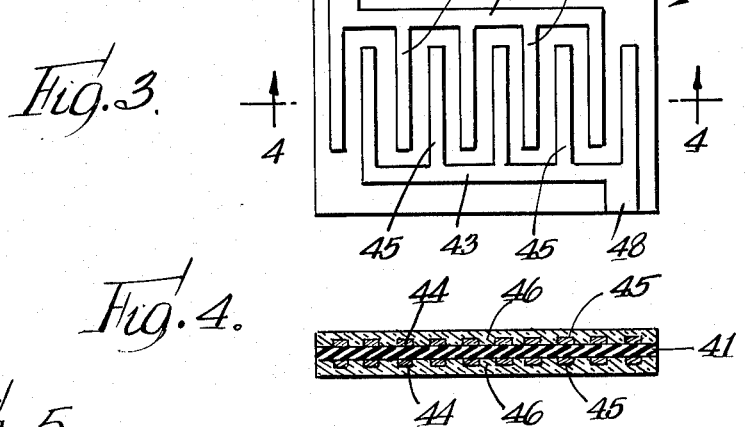
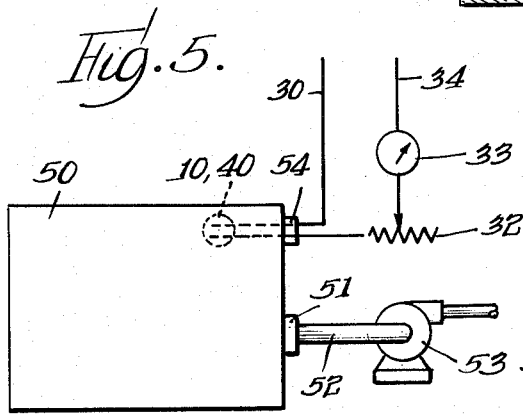
INVENTOR.
Stanford R. Ovshinsky
BY Wallenstein, Spangenberg & Hattis
Attys.

United States Patent Office 3,255,324
Patented June 7, 1966

3,255,324
MOISTURE RESPONSIVE RESISTANCE DEVICE
Stanford R. Ovshinsky, Detroit, Mich., assignor, by mesne assignments, to Energy Conversion Devices, Inc., Troy, Mich., a corporation of Delaware
Filed May 28, 1962, Ser. No. 198,353
8 Claims. (Cl. 200—61.04)

This invention relates to a moisture responsive resistance current controlling device for controlling an electrical circuit in accordance with moisture conditions of an environment affecting said device, said device utilizing solid state materials.

The principal object of this invention is to provide moisture responsive resistance current controlling devices for the foregoing purpose which will block the flow of alternating or direct current therethrough when dry, but which will effectively change sufficiently in electrical resistance to permit a substantial flow of current therethrough when moist or when exposed to moisture in the environment, and which are capable of controlling commercial electrical circuits, such as 110 volt circuits with high current flows. Such resistance changes occur as a continuous function of the moisture change so that the device of this invention may modulate the current flow. Accordingly, the moisture responsive resistance current controlling devices of this invention may be employed as transducers to control the application of electrical energy to operating devices or to provide information in electrical form for instrumentation purposes. Moisture responsive devices of this type find extensive use in controllers in humidifiers and dehumidifiers for living areas and industrial processes and may be used also as vacuum responsive devices and the like.

Various types of moisture responsive devices have been provided in the past but they have all had various inherent limitations. For example, one type of such device employs pairs of electrodes attached to a planar inert surface and is dependent for its operation upon the conductivity of moisture which condenses on the surface. Such a device provides very limited ranges of resistance change and cannot be used to directly control electrical current flow over any appreciable moisture range. The flow of electrical current through the liquid conduction layer also tends to dry out the layer by hydrolysis in such a manner so as to provide incorrect indication of the instantaneous moisture content of the environment. Another type of prior art device employs electrodes embedded in the surface of a water-soluble compound. Moisture, attracted to the surface by sorption processes, dissolves the compound so as to greatly increase its ionic conduction and therefore decrease its resistance to current flow. In such a device the reaction between the water and the compound is an exothermic one and it is necessary to heat the device in order to provide the energy for driving off the combined water. Such a device loses surface material when exposed to high levels of moisture by deliquescent processes and is therefore only useful over a limited period of time. A further type of prior art device utilizes elongated members, such as hair or the like, which physically expand or contract in accordance with the moisture content of the atmosphere. Such a device has a very limited accuracy and lower order of repeatability and otherwise exhibits all of the shortcomings of mechanical devices.

The moisture responsive resistance current controlling device of this invention eliminates the shortcomings of the aforementioned prior art devices and utilizes solid state materials which are not appreciably water-soluble but which take up and lose moisture to the environment affecting the device in accordance with the moisture content of the environment. In accordance with the present invention, the solid state materials comprise lithium compounds and compositions as will be described more fully hereafter.

Briefly, the moisture responsive resistance current controlling device of this invention, for controlling an electrical circuit in accordance with moisture conditions of an environment affecting said device, comprises spaced apart metallic electrodes, and a substantially water-insoluble lithium compound or composition interposed between and in electrical contact with the electrodes. The lithium compound or composition has at least a portion of its surface in contact with the moisture containing environment, takes up and loses moisture in accordance with the moisture content of the environment, and has a substantial negative moisture-resistance coefficient. Means are connected to the electrodes for connecting the lithium compound in series with the electrical circuit for controlling the current flow therethrough in accordance with the moisture in the lithium compound as affected by the moisture of the environment to increase the current flow upon an increase in moisture and to decrease the current flow upon a decrease in moisture.

While the physical-chemical mechanism which produces these results is not fully understood, it is believed that the substantially water-insoluble lithium compounds or compositions receive moisture on and adjacent to their boundary surfaces by adsorption processes which are limited to the physical binding of the water molecules by van der Waals forces alone as opposed to the chemisorption effect which occurs with appreciably soluble substances. It is believed, also, that the relatively low order of these binding forces allows the environment to supply the heat necessary for evaporation of the water upon the lowering of the moisture content of the environment without appreciably affecting the true ambient conditions.

I have discovered that various lithium compounds may effectively be employed as the material which is effected by the moisture containing environment for obtaining the aforementioned moisture-resistance current controlling properties for controlling the current flow in the electrical circuit in accordance with the moisture conditions thereof. Among such lithium compounds are lithium carbonate, lithium hydroxide, lithium orthosilicate, lithium sulfate, lithium acetate, lithium metasilicate, lithium metaborates, lithium fluoride, lithium oxide, lithium orthophosphate and mixtures of any two or more thereof. It is most desirable to utilize the lithium compounds which are generally water-insoluble or only slightly water-soluble, preferably having a solubility below 15 parts per 100 parts of cold water and, better still, a solubility below 8 parts per 100 parts of cold water. Also, for the purposes of this invention, it has been found that the compositions obtained by essentially burning metallic lithium in air or in oxygen are especially satisfactory, such latter compounds appearing to comprise mixtures of lithium carbonate, lithium hydroxide and lithium oxide generally in approximately equal proportions. Also, especially useful are lithium fluoride, lithium carbonate and lithium silicate complexes formed by burning lithium metal and silicon in an oxygen containing atmosphere.

The moisture responsive resistance current controlling devices of this invention may take various forms and may be utilized for control and indication purposes with respect to the moisture content of the environment affecting the devices.

Further objects of this invention reside in the constructions and compositions of the moisture responsive devices and in the cooperative relationships between the component parts thereof.

Other objects and advantages of this invention will become apparent to those skilled in the art upon reference to the accompanying specification, claims and drawing in which:

3

FIG. 1 is a diagrammatic illustration showing one form of the moisture responsive resistance current controlling device of this invention utilized for controlling the moisture content of the environment affecting the device;

FIG. 2 is a diagrammatic illustration showing the same form of the moisture responsive resistance current controlling device utilized in connection with a measuring and indicating system for indicating the moisture content of the environment;

FIG. 3 is a plan view of another form of the moisture responsive resistance current controlling device of this invention which may be utilized in the systems of FIGS. 1 and 2;

FIG. 4 is a vertical sectional view taken substantially along the line 4—4 of FIG. 3; and FIG. 5 is a diagrammatic illustration showing the manner of utilizing the moisture responsive resistance current controlling device of this invention as a vacuum responsive device.

Referring first to FIG. 1, one form of the moisture responsive resistance current controlling device of this invention is generally designated at 10. It includes a pair of spaced apart metallic wire-like electrodes 11 and 12 and a bulb or bead 13 of a lithium compound or composition of the kind described above encompassing the electrodes in electrical contact therewith, the lithium compound or composition being substantially water-insoluble and having a substantial negative moisture-resistance coefficient. The electrodes 11 and 12 are provided with extensions 14 and 15 forming leads for connecting the same into the electrical circuit to be controlled. One manner of forming the device 10 comprises heating a powdered lithium compound in a crucible with a torch until it melts. The electrodes 11 and 12 are then disposed within the molten mass and the mass allowed to cool to a hardened state about the electrodes. The device 10 in the form of FIG. 1 exhibited substantial changes in resistance when subjected to relatively dry and moist environments.

Another device 10 of the type illustrated in FIG. 1 was formed by burning commercially pure lithium metal in air until only a residue remained. This residue was then formed into a bead or bulb 13 containing the electrodes 11 and 12 in the same manner as described above. The residue was analyzed and it contained approximately equal parts of lithium carbonate, lithium hydroxide and lithium oxide. This device also exhibited substantial changes in resistance when subjected to relatively dry and moist environments. All of the foregoing devices exhibited only a small time lag of resistance change with respect to moisture changes, measurable in fractions of a second.

The moisture responsive resistance current controlling device 10, as illustrated in FIG. 1, may be utilized for controlling the moisture of the environment affecting the device and it is specifically shown as controlling a dehumidifying apparatus for this purpose. In this connection, one line 16 of an alternating current source such as a commercial 110 volt source, is connected to the lead 14 of the electrode 11 and the other lead 15 of the other electrode 12 is connected through a conductor 17 and an adjustable resistance 18 to one end of a coil 19, the other end of which is connected to the other line 20 of the alternating current source. The coil 19 may comprise the operating coil of an A.C. relay 21 which operates a normally open contact 22 of the relay. A line 23 extending from a power source is connected through the relay contact 22 and a conductor 24 to an electric motor 25 which drives the compressor of the dehumidifying apparatus, the electric motor 25 in turn being connected to a line 26 leading to the other side of the power source.

Thus, when the normally open contact 22 is open, the motor 25 and its compressor are shut off and when the normally open contact 22 is closed, the motor 25 and its compressor are turned on for dehumidifying purposes.

4

When the moisture content of the environment, which is controlled by the compressor of the dehumidifying apparatus, is below a desired value, as determined by the adjustable resistance 18, the current flow through the device 10 and hence the control circuit is below the value which would energize the relay coil 19 sufficiently to operate the same. Thus, the compressor of the dehumidifying apparatus is not operative under these conditions. When, however, the moisture content of the environment rise above this predetermined value, as determined by the adjustable resistance 18, the current flow through the device 10 and hence through the control circuit rises to a value sufficient to energize the coil 19 to close the normally open contact 22 and cause operation of the dehumidifying apparatus. Thereafter, when the moisture content of the environment is decreased below the predetermined value, the current flow through the device 10 decreases to a point to deenergize the relay to open the contact 22 and shut off the compressor. In this way, the moisture responsive resistance current controlling device 10 responds to the moisture content of the environment affecting the same and operates to maintain the moisture content thereof at the desired value.

FIG. 2 illustrates the moisture responsive resistance current controlling device 10 of FIG. 1 as controlling a measuring and indicating circuit, as distinguished from a control circuit. Here, one side of an alternating current source is connected by a line 30 to the lead 14 of the electrode 11 and the lead 15 of the electrode 12 is connected through a conductor 17 and an adjustable resistance 32 to one side of an indicating meter 33, the other side of the indicating meter being connected by a line 34 to the other side of the alternating current source. The meter 33 operates to measure the current flow in the measuring circuit for indicating the moisture content of the environment affecting the device 10. The adjustable resistance 32, which is included in this circuit, is here utilized for the purpose of calibrating the meter 33 so that the meter 33 will accurately reflect the moisture condition of the environment affecting the device 10.

The lithium compounds or compositions 13 of the device 10 are solid ionic type compounds which are subject to polarization effects which they exhibit upon the passage of uni-directional current therethrough. However, I have determined that these lithium compounds or compositions exhibit no appreciable polarization effects when subject to alternating current, the repeated reversal of the current balancing the opposite uni-directional actions against one and another. Thus, the moisture responsive resistance current controlling devices of this invention are admirably suited for use with alternating currents which is not the situation with other semi-conductor materials which operate on a direct current or voltage basis. Additionally, I have found that these lithium compounds or materials may be employed in direct current circuits if directional means such as occasional current reversal or the application of heat are employed to neutralize the directional effects. Even moisture itself tends to depolarize these devices. Thus, while FIGS. 1 and 2 illustrate alternating current applications, direct current applications may be used if desired.

Referring now to FIGS. 3 and 4 another form of the moisture responsive resistance current control device of this invention is generally designated at 40. It includes an electrical insulating sheet 41 which may be formed of any suitable material, such as mica, glass, ceramic, thermosetting plastic materials, steatite, photo-ceram or the like. Upon one side of the insulating sheet 41 is applied a pair of metallic combs 42 and 43 having interleaving teeth 44 and 45, respectively, forming metallic electrodes. The combs 52 and 53 may be formed of any suitable metallic material such as nickel, gold, rhodium or the like and may be applied in any suitable manner to the electrical insulating sheet 51 as by printing, silk screening, vacuum plating or the like. The interleaving comb teeth 44 and 45 may be made quite narrow and closely spaced so as to provide a great interleaving area in a small surface area. The combs 42 and 43 may also be provided with tab portions 47 and 48 for connecting the metallic combs into the electrical circuits of FIGS. 1 and 2.

A coating of film 46 of a lithium compound or composition of the kinds described above is applied to the surface of the insulating sheet 41 over the teeth or electrodes 44 and 45 of the metallic combs and in electrical contact therewith. The coating or film 46 of the lithium compound may be applied to the surface of the insulating sheet 41 in various ways, as for example, by printing or squeegeing a slurry of the lithium compound thereon and heating and drying the same, by heating the insulating sheet and spraying a slurry of the lithium compound thereon which is baked and dried by the heated sheet, by fuming the lithium compound and subjecting the surface to the fumes which condense and adhere thereto, or by electron beam deposition in a vacuum. Preferably, the coating or film 46 is made quite thin, as for example, a film of monomolecular thickness and upwards to thicknesses of about 0.0005 to 0.01 inch. However, if desired, the coating or film may be in a more massive form. Thus, when the combs, and hence the electrodes, are connected into the electrical circuit of FIGS. 1 and 2, the lithium compound 46 between the electrodes is connected in series in that circuit for controlling the current flow therethrough in accordance with the moisture-resistance coefficient of the lithium compound.

Because of the plurality of interleaving metallic electrodes and the thin film of lithium compound therebetween a large active surface area is presented to the moisture containing environment and the device 40 is therefore rapid in its response to the moisture conditions thereof and operates to control large current flow in the electrical circuit with minimum resistance, it having large current carrying capacities. If desired, the other side of the insulating sheet 41 may also be provided with a pair of metallic combs 42 and 43 with the tabs 47 and 48 thereof electrically connected to the corresponding tabs on the first side of the insulating sheet 41. Here, also, these latter combs 42 and 43 are provided with a thin layer or film of the lithium compound 46 as described above. By so utilizing the two assemblies and so connecting them in parallel, the current carrying capacities of the moisture responsive current controlling device is thereby increased.

As an example of the results obtained by the device 40 of FIGS. 3 and 4, where the lithium compound layers or films were applied thereto by vapor depositing the films or layers thereon from burning lithium, reference is made to the following resistance levels which were obtained at 75° F.

```
         26.0 R.H.    Infinite ¹
         80.5 R.H.    2.5×10³
        100.0 R.H.    1.0×10³
```

¹ Greater than 1×10¹⁰ as measured on a vacuum tube voltmeter.

Another example of the results obtained by utilizing the device of FIG. 4 is as follows, where the insulating sheet consisted of a glass-epoxy base with a printed circuit on one side thereof. The sheet was placed on a warm hot plate and a dilute hydrochloric acid saturated solution of lithium fluoride was sprayed on with an atomizer. The liquid evaporated leaving a thin film behind. This film was then washed with isopropyl alcohol to remove any lithium chloride which might be present and which might be undesirable because of its diliquescent properties. The following resistance levels were obtained at 75° F.

```
         33.0 R.H.    1.0×10⁸
         80.5 R.H.    7.5×10²
        100.0 R.H.    2.6×10²
```

When three such units of the aforementioned lithium fluoride type were connected in parallel and placed in a 100 R.H. (75° F.) ambient, they controlled a relay which drew 16 ma. The voltage drop across the humidity sensing device was so small that it was not measurable with normal instrumentation. An oscilloscope was connected across the device and the voltage drop was found to be 0.4 volt. When the device was placed in an ambient of 80.5 R.H. (75° F.), the drop increased to 1.0 volt. Voltage drops of this magnitude reflect a much lower resistance in the A.C. loaded condition than that obtained by checking resistance unloaded against a meter, and this has been checked out by the use of an A.C. impedance bridge measuring circuit. A possible explanation of this phenomenon is that there is a continuous polarizing and depolarizing effect which causes increased conductance. This phenomenon is of considerable importance since with virtually no voltage drop there is no internal heating, and moisture responsive resistance current controlling devices can be designed that can carry large current loads directly without the use of an intermediate relay. Such devices could be used in several ways. They could be set so that there would be no voltage drop at almost any point of the moisture scale and would provide for a null or triggering application of the devices. Another application would be a panel type device which would reflect varying moisture and still have the current carrying capacities and heat dissipation requirements of a modulating device without other amplification means required.

FIG. 5 illustrates the manner of utilizing the moisture responsive resistance current controlling device for measuring and indicating vacuum conditions. Here, a container or tank 50 carries a moisture containing gas and it is connected through a coupling 51 and a pipe 52 to a vacuum pump 53 which operates to produce a vacuum in the tank or container 50. As the vacuum pump 53 is operated moisture containing gas is pumped from the tank or container 50 to produce a vacuum therein. In so doing, moisture is withdrawn from the tank along with the gas and the moisture content of the gas remaining in the tank is proportional to the vacuum drawn in the tank. A moisture responsive resistance current controlling device of the kind illustrated in FIGS. 1 and 2 or in FIGS. 3 and 4 is placed in the tank so as to respond to the moisture content of the gas in the tank. The device 10 or 40 have leads extending through a suitable coupling 54 in the tank. A line 30 extending from one side of a current source is connected to one of the electrodes of the device and the other electrode is connected through an adjustable resistance 32 to one side of a meter 33, the other side of the meter being connected by a line 34 to the other side of the current source. Thus, the device 10 or 40 controls the current flow in the electrical circuit in accordance with the moisture content of the gas in the tank 50, and hence the vacuum condition therein, and this current flow is indicated by the meter 33. The meter 33 may be calibrated to indicate the degree of vacuum in the tank and the calibration may be effected by the adjustable resistance 32.

While for purposes of illustration several forms of this invention have been disclosed, other forms thereof may become apparent to those skilled in the art upon reference to this disclosure and, therefore, this invention is to be limited only by the scope of the appended claims.

I claim as my invention:

1. moisture responsive resistanve current controlling device for controlling an electrical circuit in accordance with moisture conditions of an environment affecting said device comprising, a substantially non-porous electrical insulating sheet, a plurality of spaced apart electrodes applied to said sheet, a continuous layer of a substantially water-insoluble composition consisting of at least one substantially water-insoluble lithium compound applied to said sheet uninterruptedly between and in electrical contact with said electrodes and having at least a portion of its surface in contact with the moisture containing environment and taking up and losing moisture in accordance with the moisture content of the environment and having a substantial negative moisture-resistance coefficient, said electrodes providing means for connecting said composition in series with the electrical circuit for controlling the current flow therethrough in accordance with the moisture in said composition as affected by the moisture of the environment to increase the current flow upon an increase in moisture and to decrease the current flow upon a decrease in moisture.

2. A moisture responsive resistance current controlling device for controlling an electrical circuit in accordance with moisture conditions of an environment affecting said device comprising, a substantially non-porous electrical insulating sheet, spaced apart metallic electrodes applied to said sheet, a continuous layer of substantially water-insoluble composition consisting of at least one substantially water-insoluble lithium compound selected from the group consisting of lithium oxide, lithium hydroxide and lithium carbonate applied to said sheet uninterruptedly between and in electrical contact with said electrodes and having at least a portion of its surface in contact with the moisture containing environment and taking up and losing moisture in accordance with the moisture content of the environment and having a substantial negative moisture-resistance coefficient, said electrodes providing means for connecting said composition in series with the electrical circuit for controlling the current flow therethrough in accordance with the moisture in said composition as affected by the moisture of the environment to increase the current flow upon an increase in moisture and to decrease the current flow upon a decrease in moisture.

3. A moisture responsive resistance current controlling device for controlling an electrical circuit in accordance with moisture conditions of an environment affecting said device comprising, a substantially non-porous electrical insulating sheet, spaced apart metallic electrodes applied to said sheet, a continuous layer of a substantially water-insoluble composition consisting of a substantially water-soluble solid fusion product resulting from essentially fully burning lithium metal in air applied to said sheet uninterruptedly between and in electrical contact with said electrodes and having at least a portion of its surface in contact with the moisture containing environment and taking up and losing moisture in accordance with the moisture content of the environment and having a substantial negative moisture-resistance coefficient, said electrodes providing means for connecting said composition in series with the electrical circuit for controlling the current flow therethrough in accordance with the moisture in said composition as affected by the moisture of the environment to increase the current flow upon an increase in moisture and to decrease the current flow upon a decrease in moisture.

4. A moisture responsive resistance current controlling device for controlling an electrical circuit in accordance with moisture conditions of an environment affecting said device comprising, a substantially non-porous electrical insulating sheet, spaced apart metallic electrodes applied to said sheet, a continuous layer of a substantially water-insoluble composition consisting of substantially water-insoluble lithium fluoride applied to said sheet uninterruptedly between and in electrical contact with said electrodes and having at least a portion of its surface in contact with the moisture containing environment and taking up and losing moisture in accordance with the moisture content of the environment and having a substantial negative moisture-resistance coefficient, said electrodes providing means for connecting said composition in series with the electrical circuit for controlling the current flow therethrough in accordance with the moisture in said composition as affected by the moisture of the environment to increase the current flow upon an increase in moisture and to decrease the current flow upon a decrease in moisture.

5. A moisture responsive resistance current controlling device for controlling an electrical circuit in accordance with moisture conditions of an environment affecting said device comprising, a substantially non-porous electrical insulating sheet, spaced apart metallic electrodes applied to said sheet, a continuous layer of a substantially water-insoluble composition consisting of substantially water-insoluble lithium carbonate applied to said sheet uninterruptedly between and in electrical contact with said electrodes and having at least a portion of its surface in contact with the moisture containing environment and taking up and losing moisture in accordance with the moisture content of the environment and having a substantial negative moisture-resistance coefficient, said electrodes providing means for connecting said composition in series with the electrical circuit for controlling the current flow therethrough in accordance with the moisture in said composition as affected by the moisture of the environment to increase the current flow upon an increase in moisture and to decrease the current flow upon a decrease in moisture.

6. A moisture responsive resistance current controlling device for controlling an electrical circuit in accordance with moisture conditions of an environment affecting said device comprising, a substantially non-porous electrical insulating sheet, spaced apart metallic electrodes applied to said sheet, a continuous layer of a substantially water-insoluble composition consisting of a substantially water-insoluble lithium silicate complex resulting from burning lithium metal and silicon in air applied to said sheet uninterruptedly between and in electrical contact with said electrodes and having at least a portion of its surface in contact with the moisture containing environment and taking up and losing moisture in accordance with the moisture content of the environment and having a substantial negative moisture-resistance coefficient, said electrodes providing means for connecting said composition in series with the electrical circuit for controlling the current flow therethrough in accordance with the moisture in said composition as affected by the moisture of the environment to increase the current flow upon an increase in moisture and to decrease the current flow upon a decrease in moisture.

7. A vacuum responsive device for controlling an electrical circuit in accordance with the vacuum condition of a moisture containing environment affecting said device comprising, a substantially non-porous electrical insulating sheet, spaced apart metallic electrodes applied to said sheet, a continuous layer of a substantially water-insoluble composition consisting of at least one substantially water-insoluble lithium compound applied to said sheet uninterruptedly between and in electrical contact with said electrodes and having at least a portion of its surface in contact with the moisture containing environment and taking up and losing moisture in accordance with the moisture content of the environment and having a substantial negative moisture-resistance coefficient, the moisture content of the environment decreasing as the vacuum condition of the environment increases, said electrodes providing means for connecting said composition in series with the electrical circuit for controlling the current flow therethrough in accordance with the moisture in said composition as affected by the moisture and hence the vacuum condition of the environment to decrease the current flow upon an increase in the vacuum condition.

8. A moisture responsive resistance current controlling device for controlling an electrical circuit in accordance with moisture conditions of an environment affecting said device comprising, a substantially non-porous electrical insulating sheet, a plurality of spaced apart electrodes applied to said sheet, a thin continuous film consisting of at least one substantially water-insoluble lithium compound applied to said sheet uninterruptedly between and in electrical contact with said electrodes and having at least a portion of its surface in contact with the moisture containing environment and taking up and losing moisture in accordance with the moisture content of the environment and having a substantial negative moisture-resistance coefficient, said electrodes providing means for connecting said film in series with the electrical circuit for controlling the current flow therethrough in accordance with the moisture in said film as affected by the moisture of the environment to increase the current flow upon an increase in moisture and to decrease the current flow upon a decrease in moisture.

References Cited by the Examiner

UNITED STATES PATENTS

| | | | |
|---|---|---|---|
| 2,127,538 | 8/1938 | Seiger | 200—61.05 |
| 2,454,584 | 11/1948 | Zingaro | 338—35 |
| 2,458,348 | 1/1949 | Cleveland | 338—35 |
| 2,510,018 | 5/1950 | Gillingham | 200—61.06 |
| 2,715,667 | 8/1955 | Auwarter | 338—35 |
| 2,870,306 | 1/1959 | Ohlheiser | 338—34 |
| 3,056,935 | 10/1962 | Jensen | 338—34 |
| 3,058,079 | 10/1962 | Jones | 338—35 |

BERNARD A. GILHEANY, *Primary Examiner.*

ROBERT K. SCHAEFER, *Examiner.*

THOMAS A. ROBINSON, THOMAS D. MACBLAIN,
*Assistant Examiners.*